United States Patent
Rubin et al.

(10) Patent No.: US 9,594,832 B2
(45) Date of Patent: Mar. 14, 2017

(54) PERSONALIZING AN ONLINE SERVICE BASED ON DATA COLLECTED FOR A USER OF A COMPUTING DEVICE

(71) Applicant: YAHOO! INC., Sunnyvale, CA (US)

(72) Inventors: Mark Rubin, San Carlos, CA (US); Brian Hein, Pacifica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 412 days.

(21) Appl. No.: 14/089,506

(22) Filed: Nov. 25, 2013

(65) Prior Publication Data

US 2014/0089411 A1 Mar. 27, 2014

Related U.S. Application Data

(63) Continuation of application No. 13/531,337, filed on Jun. 22, 2012, now Pat. No. 8,620,935.

(60) Provisional application No. 61/500,613, filed on Jun. 24, 2011.

(51) Int. Cl.
| | | |
|---|---|---|
| G06F 17/30 | (2006.01) | |
| G06Q 30/02 | (2012.01) | |
| G06Q 50/00 | (2012.01) | |
| H04L 29/08 | (2006.01) | |

(52) U.S. Cl.
CPC .. *G06F 17/30699* (2013.01); *G06F 17/30867* (2013.01); *G06Q 30/02* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | |
|---|---|---|
| 5,396,647 A | 3/1995 | Thompson et al. |
| 5,610,915 A | 3/1997 | Elliott et al. |
| 5,966,714 A | 10/1999 | Huang et al. |
| 6,020,884 A | 2/2000 | MacNaughton et al. |
| 6,285,999 B1 | 9/2001 | Page |
| 6,385,644 B1 | 5/2002 | Devine et al. |
| 6,405,197 B2 | 6/2002 | Gilmour |

(Continued)

FOREIGN PATENT DOCUMENTS

| | | |
|---|---|---|
| CN | 101351818 | 1/2009 |
| EP | 0944002 | 9/1999 |

(Continued)

OTHER PUBLICATIONS

Hannon et al., "Recommending Twitter Users to Follow Using Content and Collaborative Filtering Approaches", RecSys2010, Sep. 26-30, 2010, Barcelona, Spain.*

(Continued)

*Primary Examiner* — Jay Morrison
(74) *Attorney, Agent, or Firm* — James J. DeCarlo; Greenberg Traurig, LLP

(57) ABSTRACT

An Internet or other online service is personalized or customized based on data collected for a user of a computing device. In one embodiment, a method includes: storing a plurality of person profiles for persons associated with communications received by a user of a computing device; receiving data associated with an online service; and filtering, using at least one processor, the data based on the plurality of person profiles, wherein the filtered data is for display to the user on the computing device.

17 Claims, 7 Drawing Sheets

(56) References Cited

U.S. PATENT DOCUMENTS

| | | |
|---|---|---|
| 6,484,196 B1 | 11/2002 | Maurille |
| 6,510,453 B1 | 1/2003 | Apfel et al. |
| 6,560,620 B1 | 5/2003 | Ching |
| 6,594,654 B1 | 7/2003 | Salam et al. |
| 6,615,348 B1 | 9/2003 | Gibbs |
| 6,721,748 B1 | 4/2004 | Knight et al. |
| 6,931,419 B1 | 8/2005 | Lindquist |
| 6,952,805 B1 | 10/2005 | Tafoya et al. |
| 6,965,918 B1 | 11/2005 | Arnold et al. |
| 6,996,777 B2 | 2/2006 | Hipakka |
| 7,003,724 B2 | 2/2006 | Newman |
| 7,058,892 B1 | 6/2006 | MacNaughton et al. |
| 7,076,533 B1 | 7/2006 | Knox et al. |
| 7,085,745 B2 | 8/2006 | Klug |
| 7,103,806 B1 | 9/2006 | Horvitz |
| 7,181,518 B1 | 2/2007 | Matsumoto et al. |
| 7,185,065 B1 | 2/2007 | Holtzman et al. |
| 7,246,045 B1 | 7/2007 | Rappaport et al. |
| 7,289,614 B1 | 10/2007 | Twerdahl et al. |
| 7,328,242 B1 | 2/2008 | McCarthy et al. |
| 7,333,976 B1 | 2/2008 | Auerbach et al. |
| 7,359,894 B1 | 4/2008 | Liebman et al. |
| 7,383,307 B2 | 6/2008 | Kirkland et al. |
| 7,444,323 B2 | 10/2008 | Martinez et al. |
| 7,454,464 B2 | 11/2008 | Puthenkulam et al. |
| 7,475,109 B1 | 1/2009 | Fletcher et al. |
| 7,475,113 B2 | 1/2009 | Stolze |
| 7,512,788 B2 | 3/2009 | Choi et al. |
| 7,512,814 B2 | 3/2009 | Chen et al. |
| 7,536,384 B2 | 5/2009 | Venkataraman et al. |
| 7,539,676 B2 | 5/2009 | Aravamudan |
| 7,580,363 B2 | 8/2009 | Sorvari et al. |
| 7,593,995 B1 | 9/2009 | He et al. |
| 7,606,860 B2 | 10/2009 | Puthenkulam et al. |
| 7,620,407 B1 | 11/2009 | Donald et al. |
| 7,624,103 B2 | 11/2009 | Wiegering et al. |
| 7,627,598 B1 | 12/2009 | Burke |
| 7,634,463 B1 | 12/2009 | Katragadda et al. |
| 7,639,157 B1 | 12/2009 | Whitley et al. |
| 7,653,695 B2 | 1/2010 | Flury et al. |
| 7,685,144 B1 | 3/2010 | Katragadda |
| 7,692,653 B1 | 4/2010 | Petro et al. |
| 7,698,140 B2 | 4/2010 | Bhardwaj et al. |
| 7,702,730 B2 | 4/2010 | Spataro et al. |
| 7,707,249 B2 | 4/2010 | Spataro et al. |
| 7,707,509 B2 | 4/2010 | Naono et al. |
| 7,716,140 B1 | 5/2010 | Nielsen et al. |
| 7,720,916 B2 | 5/2010 | Fisher et al. |
| 7,724,878 B2 | 5/2010 | Timmins et al. |
| 7,725,492 B2 | 5/2010 | Sittig |
| 7,743,051 B1 | 6/2010 | Kashyap et al. |
| 7,752,081 B2 | 7/2010 | Calabria |
| 7,756,895 B1 | 7/2010 | Emigh |
| 7,756,935 B2 | 7/2010 | Gaucas |
| 7,761,436 B2 | 7/2010 | Norton et al. |
| 7,788,260 B2 | 8/2010 | Lunt |
| 7,805,492 B1 | 9/2010 | Thatcher et al. |
| 7,818,396 B2 | 10/2010 | Dolin et al. |
| 7,827,208 B2 | 11/2010 | Bosworth |
| 7,827,265 B2 | 11/2010 | Cheever et al. |
| 7,831,692 B2 | 11/2010 | French et al. |
| 7,836,045 B2 | 11/2010 | Schachter |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,865,562 B2 | 1/2011 | Nesbitt et al. |
| 7,870,197 B2 | 1/2011 | Lewis et al. |
| 7,899,806 B2 | 3/2011 | Aravamudan |
| 7,899,871 B1 | 3/2011 | Kumar et al. |
| 7,908,647 B1 | 3/2011 | Polis et al. |
| 7,925,690 B2 | 4/2011 | Smith et al. |
| 7,930,430 B2 | 4/2011 | Thatcher et al. |
| 7,949,611 B1 | 5/2011 | Nielsen et al. |
| 7,949,627 B2 | 5/2011 | Aravamudan |
| 7,970,832 B2 | 6/2011 | Perry, Jr. et al. |
| 7,979,569 B2 | 7/2011 | Eisner et al. |
| 7,991,764 B2 | 8/2011 | Rathod |
| 7,996,456 B2 | 8/2011 | Gross |
| 8,005,806 B2 | 8/2011 | Rupp et al. |
| 8,055,715 B2 | 11/2011 | Bensky et al. |
| 8,073,928 B2 | 12/2011 | Dolin et al. |
| 8,086,676 B2 | 12/2011 | Palahnuk et al. |
| 8,086,968 B2 | 12/2011 | McCaffrey et al. |
| 8,140,566 B2 | 3/2012 | Boerries et al. |
| 8,145,791 B2 | 3/2012 | Thatcher et al. |
| 8,151,358 B1 | 4/2012 | Herold |
| 8,161,122 B2 | 4/2012 | Sood et al. |
| 8,200,761 B1 | 6/2012 | Tevanian |
| 8,200,808 B2 | 6/2012 | Ishida |
| 8,204,897 B1 | 6/2012 | Djabarov et al. |
| 8,239,197 B2 | 8/2012 | Webb et al. |
| 8,244,848 B1 | 8/2012 | Narayanan et al. |
| 8,284,783 B1 | 10/2012 | Maufer et al. |
| 8,291,019 B1 | 10/2012 | Rochelle et al. |
| 8,296,179 B1 | 10/2012 | Rennison |
| 8,316,315 B2 | 11/2012 | Portnoy et al. |
| 8,363,803 B2 | 1/2013 | Gupta |
| 8,365,235 B2 | 1/2013 | Hunt et al. |
| 8,392,409 B1 | 3/2013 | Kashyap et al. |
| 8,392,836 B1 | 3/2013 | Bau et al. |
| 8,412,174 B2 | 4/2013 | Khosravi |
| 8,423,545 B2 | 4/2013 | Cort et al. |
| 8,433,762 B1 | 4/2013 | Wald et al. |
| 8,443,441 B2 | 5/2013 | Stolfo et al. |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Brezina et al. |
| 8,600,343 B2 | 12/2013 | Brezina et al. |
| 8,606,335 B2 | 12/2013 | Ozaki |
| 8,620,935 B2 | 12/2013 | Rubin et al. |
| 8,661,002 B2 | 2/2014 | Smith et al. |
| 8,666,035 B2 | 3/2014 | Timmins et al. |
| 8,694,633 B2 | 4/2014 | Mansfield et al. |
| 8,745,060 B2 | 6/2014 | Brezina et al. |
| 8,793,625 B2 | 7/2014 | Rhee et al. |
| 8,849,816 B2 | 9/2014 | Burba et al. |
| 8,972,257 B2 | 3/2015 | Bonforte |
| 8,984,074 B2 | 3/2015 | Monaco |
| 8,990,323 B2 | 3/2015 | Hein et al. |
| 9,020,938 B2 | 4/2015 | Cort et al. |
| 9,058,366 B2 | 6/2015 | Brezina et al. |
| 9,087,323 B2 | 7/2015 | Hein et al. |
| 9,159,057 B2 | 10/2015 | Monaco |
| 9,195,753 B1 | 11/2015 | King et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |

(56) References Cited

U.S. PATENT DOCUMENTS

| | | |
|---|---|---|
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0167324 A1 | 9/2003 | Farnham et al. |
| 2003/0204439 A1 | 10/2003 | Cullen, III |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 * | 1/2004 | Griffin ............... H04L 12/1827 709/204 |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027779 A1 | 2/2005 | Schinner |
| 2005/0038687 A1 | 2/2005 | Galdes |
| 2005/0044152 A1 | 2/2005 | Hardy et al. |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0080868 A1 | 4/2005 | Malik |
| 2005/0091272 A1 | 4/2005 | Smith et al. |
| 2005/0091314 A1 | 4/2005 | Blagsvedt et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0213511 A1 | 9/2005 | Reece et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101350 A1 | 5/2006 | Scott |
| 2006/0123357 A1 | 6/2006 | Okamura |
| 2006/0136494 A1 | 6/2006 | Oh |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 * | 10/2006 | Fox ........................ G06Q 10/00 709/206 |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0203991 A1 | 8/2007 | Fisher et al. |
| 2007/0208802 A1 | 9/2007 | Barman et al. |
| 2007/0214141 A1 | 9/2007 | Sittig |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0271527 A1 | 11/2007 | Paas et al. |
| 2007/0273517 A1 | 11/2007 | Govind |
| 2007/0282956 A1 | 12/2007 | Staats |

(56) References Cited

U.S. PATENT DOCUMENTS

| | | |
|---|---|---|
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth |
| 2008/0040435 A1 | 2/2008 | Buschi et al. |
| 2008/0040474 A1 | 2/2008 | Zuckerberg |
| 2008/0040475 A1 | 2/2008 | Bosworth |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |
| 2008/0319943 A1 | 12/2008 | Fischer |
| 2009/0005076 A1 | 1/2009 | Forstall et al. |
| 2009/0010353 A1 | 1/2009 | She et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0119678 A1 | 5/2009 | Shih et al. |
| 2009/0156170 A1 | 6/2009 | Rossano et al. |
| 2009/0157717 A1 | 6/2009 | Palahnuk et al. |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0209286 A1 | 8/2009 | Bentley et al. |
| 2009/0213088 A1 | 8/2009 | Hardy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0328161 A1 | 12/2009 | Puthenkulam et al. |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah |
| 2010/0057858 A1 | 3/2010 | Shen et al. |
| 2010/0057859 A1 | 3/2010 | Shen et al. |
| 2010/0062753 A1 | 3/2010 | Wen et al. |
| 2010/0070875 A1 | 3/2010 | Turski et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0100899 A1 | 4/2010 | Bradbury et al. |
| 2010/0121831 A1* | 5/2010 | Lin ............... G06F 17/3089 707/706 |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay |
| 2010/0167700 A1 | 7/2010 | Brock et al. |
| 2010/0169327 A1 | 7/2010 | Lindsay |
| 2010/0174784 A1 | 7/2010 | Levey et al. |
| 2010/0185610 A1 | 7/2010 | Lunt |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0281535 A1 | 11/2010 | Perry, Jr. et al. |
| 2010/0306185 A1 | 12/2010 | Smith |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0145192 A1 | 6/2011 | Quintela |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort |
| 2011/0196802 A1 | 8/2011 | Ellis et al. |

(56) References Cited

U.S. PATENT DOCUMENTS

| | | | |
|---|---|---|---|
| 2011/0201275 A1* | 8/2011 | Jabara | H04L 12/5692 455/41.2 |
| 2011/0219317 A1 | 9/2011 | Thatcher | |
| 2011/0225293 A1 | 9/2011 | Rathod | |
| 2011/0231407 A1 | 9/2011 | Gupta et al. | |
| 2011/0235790 A1 | 9/2011 | Strope et al. | |
| 2011/0252383 A1 | 10/2011 | Miyashita | |
| 2011/0276396 A1 | 11/2011 | Rathod | |
| 2011/0282905 A1 | 11/2011 | Polis et al. | |
| 2011/0291860 A1* | 12/2011 | Ozaki | G01C 21/3694 340/905 |
| 2011/0291933 A1 | 12/2011 | Holzer et al. | |
| 2011/0298701 A1 | 12/2011 | Holzer et al. | |
| 2012/0011204 A1 | 1/2012 | Morin et al. | |
| 2012/0017158 A1 | 1/2012 | Maguire et al. | |
| 2012/0036254 A1 | 2/2012 | Onuma | |
| 2012/0041907 A1 | 2/2012 | Wang et al. | |
| 2012/0054681 A1 | 3/2012 | Cort et al. | |
| 2012/0079023 A1 | 3/2012 | Tejada-Gamero et al. | |
| 2012/0084461 A1 | 4/2012 | Athias et al. | |
| 2012/0089678 A1 | 4/2012 | Cort | |
| 2012/0089690 A1 | 4/2012 | Hein et al. | |
| 2012/0110080 A1 | 5/2012 | Panyam et al. | |
| 2012/0110096 A1 | 5/2012 | Smarr et al. | |
| 2012/0150970 A1 | 6/2012 | Peterson et al. | |
| 2012/0150978 A1 | 6/2012 | Monaco et al. | |
| 2012/0150979 A1 | 6/2012 | Monaco | |
| 2012/0166999 A1 | 6/2012 | Thatcher | |
| 2012/0197871 A1 | 8/2012 | Mandel et al. | |
| 2012/0198348 A1 | 8/2012 | Park | |
| 2012/0246065 A1 | 9/2012 | Yarvis et al. | |
| 2012/0259834 A1 | 10/2012 | Broder et al. | |
| 2012/0271822 A1 | 10/2012 | Schwendimann et al. | |
| 2012/0278428 A1 | 11/2012 | Harrison et al. | |
| 2012/0330658 A1 | 12/2012 | Bonforte | |
| 2012/0330980 A1 | 12/2012 | Rubin et al. | |
| 2012/0331418 A1 | 12/2012 | Bonforte | |
| 2013/0007627 A1 | 1/2013 | Monaco | |
| 2013/0014021 A1 | 1/2013 | Bau et al. | |
| 2013/0080915 A1 | 3/2013 | Lewis et al. | |
| 2013/0091288 A1 | 4/2013 | Shalunov et al. | |
| 2013/0173712 A1 | 7/2013 | Monjas Llorente et al. | |
| 2013/0246931 A1 | 9/2013 | Harris et al. | |
| 2013/0260795 A1 | 10/2013 | Papakipos et al. | |
| 2014/0011481 A1 | 1/2014 | Kho | |
| 2014/0081914 A1 | 3/2014 | Smith et al. | |
| 2014/0081964 A1 | 3/2014 | Rubin et al. | |
| 2014/0087687 A1 | 3/2014 | Brezina et al. | |
| 2014/0089304 A1 | 3/2014 | Rubin et al. | |
| 2014/0095433 A1 | 4/2014 | Cort et al. | |
| 2014/0100861 A1 | 4/2014 | Ledet | |
| 2014/0115086 A1 | 4/2014 | Chebiyyam | |
| 2014/0156650 A1 | 6/2014 | Jacobson | |
| 2014/0207761 A1 | 7/2014 | Brezina et al. | |
| 2014/0214981 A1 | 7/2014 | Mallet et al. | |
| 2014/0280097 A1 | 9/2014 | Lee et al. | |
| 2014/0287786 A1 | 9/2014 | Bayraktar et al. | |
| 2015/0074213 A1 | 3/2015 | Monaco | |
| 2015/0170650 A1 | 6/2015 | Bonforte | |
| 2015/0222719 A1 | 8/2015 | Hein et al. | |
| 2016/0070787 A1 | 3/2016 | Brezina et al. | |
| 2016/0182661 A1 | 6/2016 | Brezina et al. | |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020020060386 | 8/2012 |
| KR | 1020090115239 | 8/2012 |
| WO | 03098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

Epstein, "Harnessing User Data to Improve Facebook Features", Doctoral dissertation, Boston College, May 12, 2010.*

"The Ultimate Guide for Everything Twitter", Webdesigner Depot, archive.org webpage https://web.archive.org/web/20090325042115/http://www.webdesignerdepot.com/2009/03/the-ultimate-guide-for-everything-twitter/ from Mar. 25, 2009.*

European Patent Application No. 11849271.9, Extended Search Report, Apr. 3, 2014.

European Patent Application No. 12801970.0, Extended Search Report, Oct. 23, 2014.

European Patent Application 12801998.1, Extended Search Report, Feb. 10, 2015.

Extended European Search Report, EP 10 78 3783, dated Mar. 24, 2014.

International Patent Application PCT/US10/52081, International Search Report and Written Opinion, May 20, 2011.

International Patent Application PCT/US11/64958, International Search Report and Written Opinion, Jul. 31, 2012.

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

Elsayed, Tamer et al., "Personal Name Resolution in Email: A Heuristic Approach," University of Maryland Technical Report No. TR-LAMP-150, Mar. 17, 2008.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-0.8.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

International Patent Application PCT/US10/34782, International Search Report, Dec. 22, 2010.

International Patent Application PCT/US10/34782, Written Opinion, Dec. 22, 2010.

International Patent Application PCT/US10/35405, International Search Report and Written Opinion, Jan. 3, 2011.

International Patent Application PCT/US12/043523, International Search Report and Written Opinion, Nov. 28, 2012.

Microsoft Corporation, "About AutoComplete Name Suggesting," Microsoft Outlook 2003 help forum, located at http://office.microsoft.com/en-us/outlook/HP063766471033.aspx, 2003.

(56) References Cited

OTHER PUBLICATIONS

OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
International Patent Application PCT/US2011/064892, International Search Report and Written Opinion, Aug. 22, 2012.
International Patent Application PCT/US2012/043507, International Search Report and Written Opinion, Jan. 3, 2013.
U.S. Appl. No. 61/407,018, filed Oct. 27, 2010.
International Patent Application PCT/US10/56560, International Search Report and Written Opinion, Jun. 21, 2011.
Oberhaus, Kristin, "Look for Cues: Targeting Without Personally Identifiable Information," W3i, LLC blog entry located at http://blog.w3i.com/2009/09/03/looking-for-cues-targeting-without-peronally-identinfiable-information/, Sep. 3, 2009.
W3i, LLC, "Advertiser Feedback System (AFS)," company product description. Sep. 22, 2009.
Wikirriedia Foundation, Inc. "Machine Learning," Wikipedia encyclopedia entry located at http://en.wikipedia.org/wiki/Machine_learning, Jan. 30, 2011.
"OpenSocial Specification v0.9", OpenSocial and Gadgets Specification Group, Apr. 2009.
European Patent Application No. 10797483.4, extended European Search Report, Dec. 20, 2016.

\* cited by examiner

PERSONALIZING AN ONLINE SERVICE BASED ON DATA COLLECTED FOR A USER OF A COMPUTING DEVICE

CROSS-REFERENCE TO RELATED APPLICATIONS

The present application is a continuation application of U.S. patent application Ser. No. 13/531,337, filed on Jun. 22, 2012, which claims priority to U.S. Prov. App. Ser. No. 61/500,613, filed Jun. 24, 2011, both entitled "Personalizing an Online Service Based on Data Collected for a User of a Computing Device," the entire disclosures of which applications are incorporated herein by reference.

The present application is related to U.S. patent application Ser. No. 14/084,299, filed Nov. 19, 2013, entitled "Personalizing an Online Service Based on Data Collected for a User of a Computing Device", by Rubin et al., the entire contents of which application are incorporated by reference as if fully set forth herein.

The present application is also related to U.S. patent application Ser. No. 12/792,698, filed Jun. 2, 2010, entitled "SELF POPULATING ADDRESS BOOK," by Smith et al., which was also published as U.S. Patent Publication No. 2010/0306185 on Dec. 2, 2010, the entire contents of which application are incorporated by reference as if fully set forth herein.

The present application is also related to U.S. Patent Application Ser. No. 61/423,052, filed Dec. 14, 2010, entitled "SENDER-BASED RANKING OF PERSON PROFILES AND MULTI-PERSON AUTOMATIC SUGGESTIONS," by Peter Monaco, and also to U.S. Patent Publication No. 2012/0150979 published on Jun. 14, 2012, and having the same title and inventor as the foregoing provisional application, the entire contents of which application are incorporated by reference as if fully set forth herein.

The present application is also related to Patent Publication No. US 2009/0031232, published Jan. 29, 2009, entitled "METHOD AND SYSTEM FOR DISPLAY OF INFORMATION IN A COMMUNICATION SYSTEM GATHERED FROM EXTERNAL SOURCES," by Brezina et al., the entire contents of which application are incorporated by reference as if fully set forth herein.

The present application is also related to Patent Publication No. US 2009/0031245, published Jan. 29, 2009, entitled "METHOD AND SYSTEM FOR COLLECTING AND PRESENTING HISTORICAL COMMUNICATION DATA," by Brezina et al., the entire contents of which application are incorporated by reference as if fully set forth herein.

The present application is also related to Patent Publication No. US 2009/0106676, published Apr. 23, 2009, entitled "APPLICATION PROGRAMMING INTERFACES FOR COMMUNICATION SYSTEMS," by Brezina et al., the entire contents of which application are incorporated by reference as if fully set forth herein.

FIELD OF THE TECHNOLOGY

At least some embodiments disclosed herein relate to data and information processing systems in general, and more particularly, but not limited to, personalizing or customizing an Internet or other online service based on data collected for a user of a computing device.

BACKGROUND

The Twitter online service previously has launched a so-called "Twitter Lists" feature that provides a way to organize the people that a person is following on the Twitter service. Twitter Lists are a "groups" feature and offer a way for a person to collect together other users on Twitter into groups so that the person can get an overview of what these other users are doing. These Twitter Lists are not static listings of users, but are curated Twitter streams of the latest tweets from a specified set of users.

A user can create a list that groups together people for whatever reason the user may decide (e.g., the members of the user's family), and then the user can get a snapshot of the things those other users are saying online by viewing the page for that particular list (i.e., the page for that specific Twitter List that the user created). This page includes a complete tweet stream for everyone on the list. These lists allow the user to organize the people the user is following into groups, and the lists allow the user to include people that the user is not following.

Because Twitter Lists create grouped tweet streams of the people that are on them, a user can use Lists to organize the user's tweets into groups based on anything the user desires. For example, a list of every employee at a company may be created. By viewing or following this company list, the user could easily see what all of the company's employees are tweeting about. The user can do the same thing with his or her co-workers, family, or friends, or just group Twitter users based on location, subject, or anything else the user may select.

When a user follows a Twitter List, the user is not actually following every user on the list, but is following the entire list—those users' tweets aren't added to the user's main stream. The user can then visit that list and view its tweet stream. This is why the user can also use Lists to follow people without really following them. For example, if there are users whose tweets a user would like to follow, but whom the user does not necessarily want in his or her main Twitter stream (e.g., they tweet too often for a user's personal liking), the user can add them to a list and then check up on their latest tweets every once in a while by viewing the user's list.

SUMMARY OF THE DESCRIPTION

Systems and methods for personalizing or customizing an Internet or other online service based on data collected for a user of a computing device (e.g., a mobile device, a desktop computer, or other computing device) are described herein. Some embodiments are summarized in this section.

In one embodiment, a method includes: storing a plurality of person profiles for persons associated with communications received by a user of a computing device; receiving data associated with an online service; and filtering, using at least one processor, the data based on the plurality of person profiles, wherein the filtered data is for display to the user on the computing device (e.g., display via a web page presented on a desktop or laptop computer).

In one embodiment, each of the persons associated with the communications received by the user may be a person cc'd or copied on one of the communications, a person bcc'd or blind-copied on one of the communications, a sender of one of the communications, a recipient of one of the communications, or a person referenced in the body, text, or other content of one of the communications.

In various embodiments, the computing device may be a mobile device (e.g., an iPhone or Android device), a desktop computer, a laptop computer, a tablet computer, or a computing apparatus for presenting information on an advertising display or electronic billboard (e.g., a billboard in Times Square or other forms of display suitable for public presentation).

In another embodiment, a method includes: storing, using at least one processor, a plurality of person profiles for persons associated with communications received by a user of a computing device (e.g., a desktop computer); creating a list of persons available on an online service; receiving a feed (e.g., a list or stream of messages or other information) from the online service that is based on the list of persons; and customizing the feed based on the plurality of person profiles.

In another embodiment, a method includes: storing a plurality of person profiles for persons associated with communications received by a user of a computing device; determining a set of persons of the person profiles that are active on an online service; filtering the set of persons to provide a plurality of highly-ranked persons, the filtering based on the plurality of person profiles; and creating a list using the highly-ranked persons, wherein the list is for presentation to the user on the computing device.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
FIG. 1 shows a user screen on a display of a computing device (e.g., a web page presented on a desktop computer) having a list of a logged-in user's top-ranked contacts according to one embodiment.
Figure 1:

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, a server stores and analyzes data associated with a user of a computing device (e.g., a mobile device). The server may store the data, for example, in a database in the form of person profiles. The data collected may be associated with prior communications and/or other activity of the user on the mobile or other computing device (e.g., data extracted from prior emails or other communications received or sent by the user). The data may be, for example, extracted by the server in the course of the transmission of the communications, the mobile or other computing device may send the data to the server, and/or other approaches may be used by the server to collect the data. Numerous examples of various types of data (e.g., person profiles for callers associated with the user) that may be collected in a database for the user are described in U.S. patent application Ser. No. 12/792,698 and/or other of the patent applications and patent publications incorporated by reference above.

In one embodiment, data may be collected from multiple different devices. For example, data may be collected from a user of a web page, a desktop application, a mobile device, etc. Feeds as described herein (e.g., a curated feed or stream of more meaningful or relevant contacts) may be displayed on multiple different devices such as, for example, a mobile device, another computing platform presenting a web page to a user, as part of a user interface in a desktop application, or even on public or large-scale display or advertising devices (e.g., Times Square ticker feed display). In addition, the behavior of a user on a mobile and other devices may be observed to provide data as to the user's context, and data be collected from these observations (e.g., by a server or otherwise). For example, data may be collected from the behavior of a user when the user is interacting with a desktop application, or making selections or other actions within a web page, etc.

The data collected on the server may be used to customize the providing of an online service (e.g., the Twitter service and providing of Twitter feeds or tweets) to the user. In one embodiment, the data collected for the user represents an implicit or social graph of the user that is used to filter or select a subset of data from a larger set of data associated with the online service. For example, the social graph may be used by a user of Twitter to select new people to follow on the Twitter service, or to customize the Twitter feed (e.g., to select the people to include in the feed). The use of the social graph may be done on a real-time or other periodic, dynamic basis (e.g., as the collected data is updated on the server, changes in the customization of the online service may be implemented). In other embodiments, the online service may be a travel service, a texting service, an e-commerce service or yet other services.

In an alternative embodiment, filtering of a feed may be based on more than merely a ranking of contacts. More specifically, a feed may be filtered based on the ratio of noise to a contact's rank. In other words, a contact determined to be un-important (e.g., having a rank below a predetermined threshold) is still included in the feed even though the contact tweets infrequently (e.g., less than once or other given number of times in a given time period). However, if this un-important contact (e.g., a low-ranked person based on relevancy) is noisy (e.g., tweets frequently, say more than a predetermined number of tweets for a given time period), the contact will be excluded. This creates a more diverse feed without flooding a user with lots of undesirable information. Although volubility may be used for such a noise filter, in other embodiments content analysis, personal relationship distance, similarity in job distance, etc., could also be used.

In one embodiment, a mobile device of a user or a server associated with the mobile device or the user stores data (e.g., in a database in the form of person profiles) associated with prior communications and/or other activity of the user on the mobile device (e.g., data extracted from one or more of the following: prior communications such as email or text messages, voice messages, or other documents or information received by the user from the user's friends or other persons such as work associates). The other activity may include the manner or ways in which the user operates the mobile device (e.g., what buttons or functions or activated when the user has previously interacted with another person, or what online service is used by the user when previously interacting with another person). This collected data is used for determining a ranking of contacts for personalizing or customizing an online service.

In one embodiment, a ranking server (e.g., ranking server 123 of FIG. 6 discussed below) collects email and other communications data associated with a mobile device of a user as described above. This ranking server, or alternatively a different server in other embodiments, determines a ranking of a predetermined number of the user's most highly-ranked contacts/persons (e.g., a top 100 list). A server obtains data for some or all users that are available or active on the Twitter service (e.g., this data may include Twitter screen names provided or made available by the Twitter service).

Using this obtained data, the ranking server determines which of the most highly-ranked contacts are on the Twitter service (e.g., by matching Twitter screen names or other information from the Twitter service with corresponding or related data in person profiles previously extracted from user communications data), and then a Twitter List is created using these contacts. The Twitter List (or data from the Twitter List) is followed by the user (e.g., on the user's mobile device) or otherwise presented to the user. As an alternative to use of the Twitter List, these contacts may be indicated to the Twitter service as contacts to be followed by the user.

The foregoing process can be dynamic such that the rankings and selected contacts change, for example, hourly or daily or using another predetermined time period. The ranking server also may infer data from user behavior on his or her mobile device. For example, the ranking may be adjusted for certain criteria on a mobile phone due to a mobile device being more temporally-based or focused. In contrast, other criteria that is less temporally focused may be used, for example, on a desktop computer of the user, or for the user's Outlook email client/account.

Thus, different user contexts may be used to provide different rankings appropriate to those contexts, and thus different feeds of data may be provided from the Twitter service to different, particular devices of the user (e.g., a mobile device feed is different than a tablet computer feed). For example, the top 100 contacts for a user's phone may be different than the top 100 contacts for the user's desktop computer, or the top 100 contacts from use of Outlook email.

In one embodiment, the list of persons for a user to follow on Twitter may be selected based on a ranking determined from relevancy of each person to the user by ranking of each person from data collected on the server associated with the mobile device. For example, this ranking may be done as described for ranking of contacts in U.S. patent application Ser. No. 12/792,698, incorporated by reference above.

In another embodiment, a Twitter List is used. A user of the Twitter service can create a Twitter List (and any Twitter contact may be added to the user's list). This Twitter List will create a feed from everyone on the List (so the user does not have to actually follow them). A Twitter List for a user is created and the List is given a name (e.g., Bambi). The user signs onto the Twitter service, and a server creates this List on the user's account on behalf of the user. The user then may log in (e.g., log into www.twitter.com) to see the feed from the List.

A user interface with a List tab may be presented to the user, and the List is accessed using this tab. The user does not create this List herself—instead a server acting at the user's request creates this List for the user from one or more servers by analyzing the data previously collected for the user.

If the user clicks on a user screen, the user can see tweets from numerous contacts on the Twitter service. The List can be created for the user, and then the user may access this List from any computing device that is configured to access the Twitter service and that supports Twitter Lists (e.g., a Twitter client).

FIG. 1 shows a user screen 10 on a display of a computing device (e.g., a web page presented on a desktop computer) having a list of a logged-in user's top-ranked contacts 12 according to one embodiment. There is an affordance 14 (indicated by "Tweeting Now") to view either the user's home stream (the stream of tweets the user would normally see in a Twitter client) or the stream 16 of tweets from the user's most relevant contacts. The list of users whose tweets appear in the latter is the result of the contact ranking process applied to collected data as was discussed above, the use of logic and processing to determine which contacts are on Twitter, and the use of logic and processing to determine which contacts on Twitter will be contacts for which the user is interested in seeing their tweets.

Figure 2:
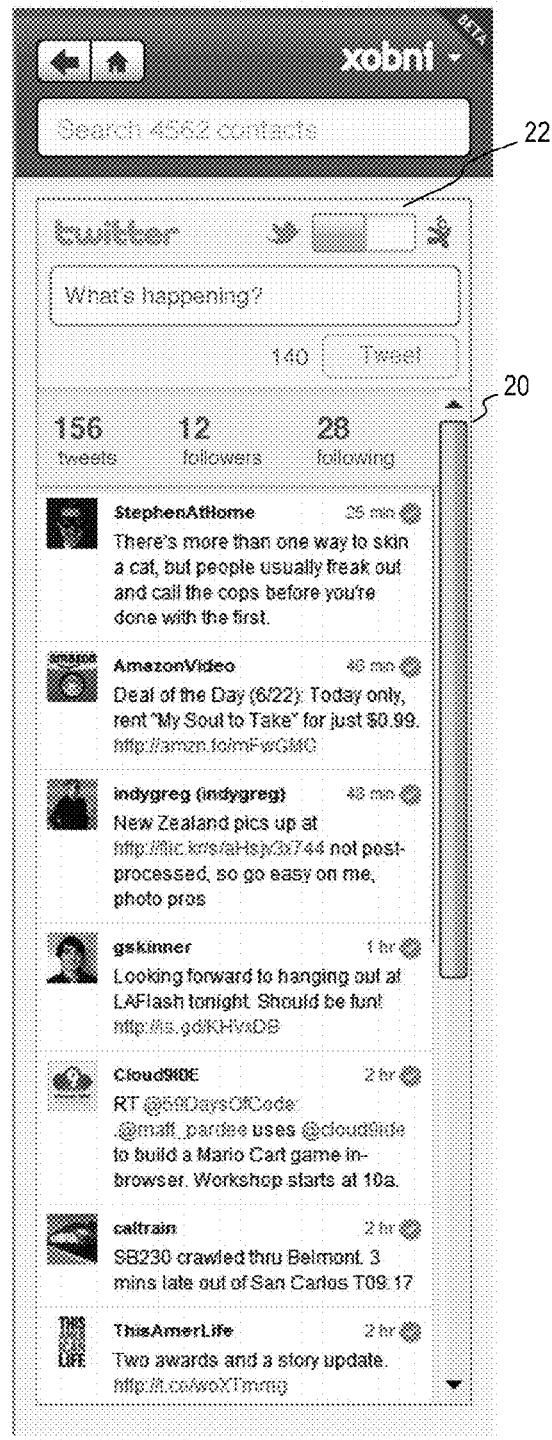
FIG. 2 shows a user screen example of a user's typical home stream according to one embodiment.

FIG. 2 shows a user screen 20 example of a user's typical home stream according to one embodiment. A toggle button 22 on the top right is on the bird icon, indicating this is the Twitter home stream. Any tweets shown in this view that are from contacts known to the ranking server (i.e., the server that ranks contacts from user collected data) may contain information about the tweeter not normally shown in a typical presentation of the user's home Twitter stream. For example, the ranking server may know the proper name for this tweeter (e.g., correct spelling or nickname as determined from email header information, email body contents, or other features of the emails the user has previously received), and may display it to the user. As another example, clicking on a tweet from a known contact will cause the ranking server to show the user a contact card describing information the ranking server knows about that user (e.g., name, phone number, email addresses, company worked at, job title and description, etc.).

Figure 3:
FIG. 3 shows on the left a user screen depiction of an input box where a user can type his or her own tweets and send them, and further shows on the right a user screen depiction of the stream of tweets coming from tweeters that have been determined to be more meaningful contacts (e.g., as based on relevancy rankings) for the user, according to one embodiment.

FIG. 3 shows on the left a user screen 30 depiction of an input box where a user can type his or her own tweets and send them, and further shows on the right a user screen 32 depiction of the stream of tweets coming from tweeters that have been determined to be more meaningful contacts (e.g., based on relevancy ranking and/or other criteria) for the user, according to one embodiment. The toggle button 34 on the top right is on the Xobni person icon (opposite the bird icon), indicating that this is the stream of tweets from the ranking server. Some of the tweeters whose tweets are listed here may already be someone the user is following in his or her home stream (as indicated by the check mark next to the tweeter), but many may and typically will likely not be. The ranking server typically will have found contacts meaningful to the logged-in user who are tweeting (and which the user is not following—it is likely that the user had no idea these contacts were tweeting or what their Twitter screen names are).

As was mentioned above for FIG. 2, because these tweeters are contacts known to the ranking server, the ranking server (or associated servers) may be used to display richer contact information for the tweeters than is shown in typical Twitter clients (e.g. name, phone number, and other personal and professional details). Also, as mentioned above for FIG. 2, clicking on a tweet from one of these users will cause the ranking server to display a richer set of information about the contact than can be easily displayed in just a small screen area.

Finally, it should be noted that a mouse-over user movement in the user interface provides the user access to typical Twitter operations (e.g. follow, reply, retweet); but again, this is for tweets the user is seeing because the ranking server has determined that these contacts are tweeters who are likely to be interesting to the logged-in user, even though the user is not explicitly following them on Twitter. Not depicted here is that these tweets are gleaned from the Twitter service by assembling a Twitter List consisting of the Twitter IDs that match the contacts that the ranking server has determined are meaningful to the user (and who have Twitter IDs).

In an alternative embodiment, a user's home stream and a user's curated stream (i.e., stream for more meaningful contacts) may be combined for presentation. More specifically, a display of combined tweets (not illustrated) that come from the user's home feed and the curated feed are presented to the user on a display of a computing device. For example, the user may be following people not in the curated list, and vice versa. This combined feed allows the user to see the tweets from both types of feeds at the same time (e.g., on a single display).

Figure 4:
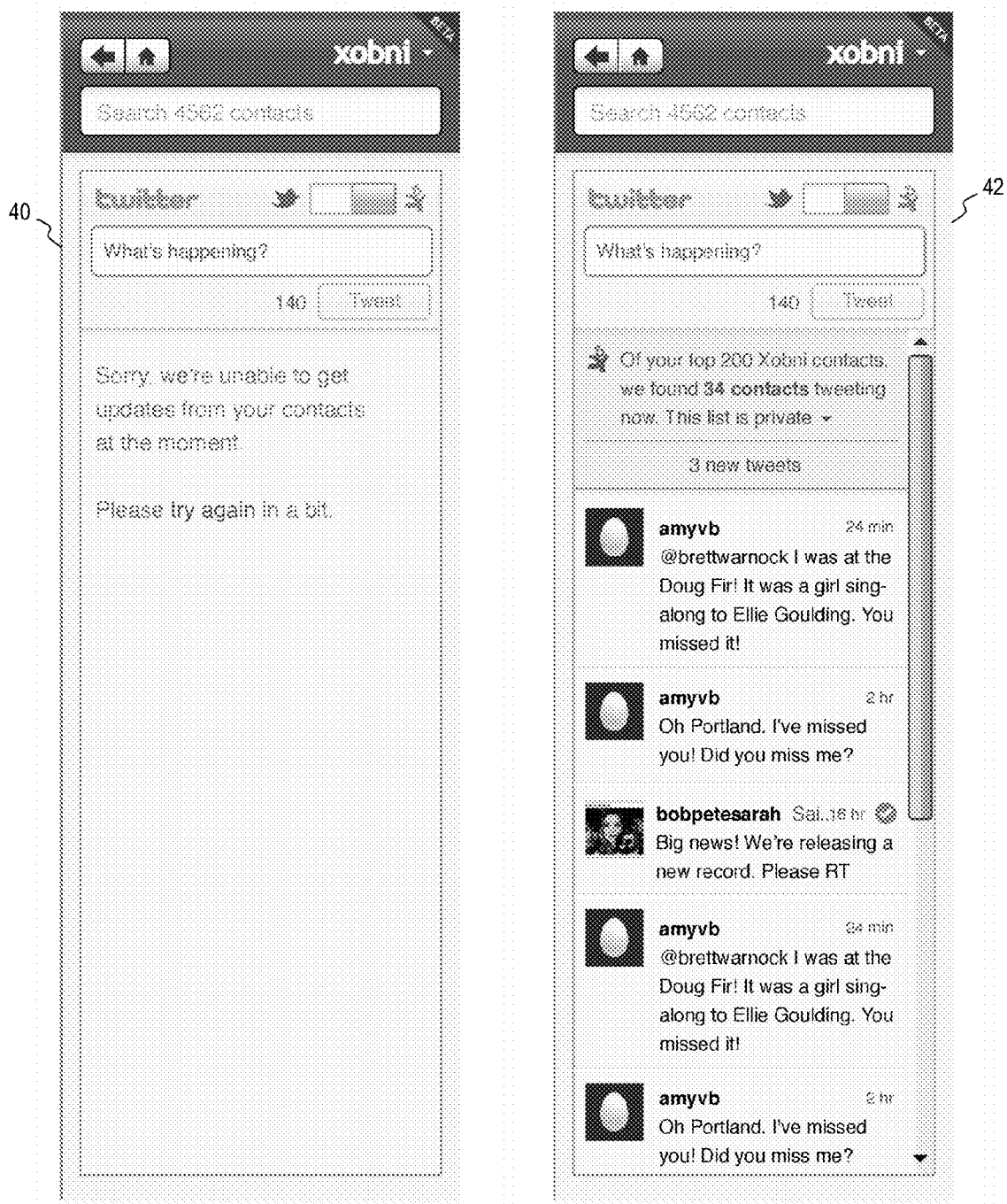
FIG. 4 shows on the left a user screen depiction of the handling of temporary errors/server downtime, and further shows on the right a user screen depiction of the handling of notifications of new tweets from Twitter users, according to one embodiment.

FIG. 4 shows on the left a user screen 40 depiction of the handling of temporary errors/server downtime, and further shows on the right a user screen 42 depiction of the handling of notifications of new tweets from Twitter users (even though these are not Twitter users the logged-in user has explicitly followed), according to one embodiment.

Figure 5:
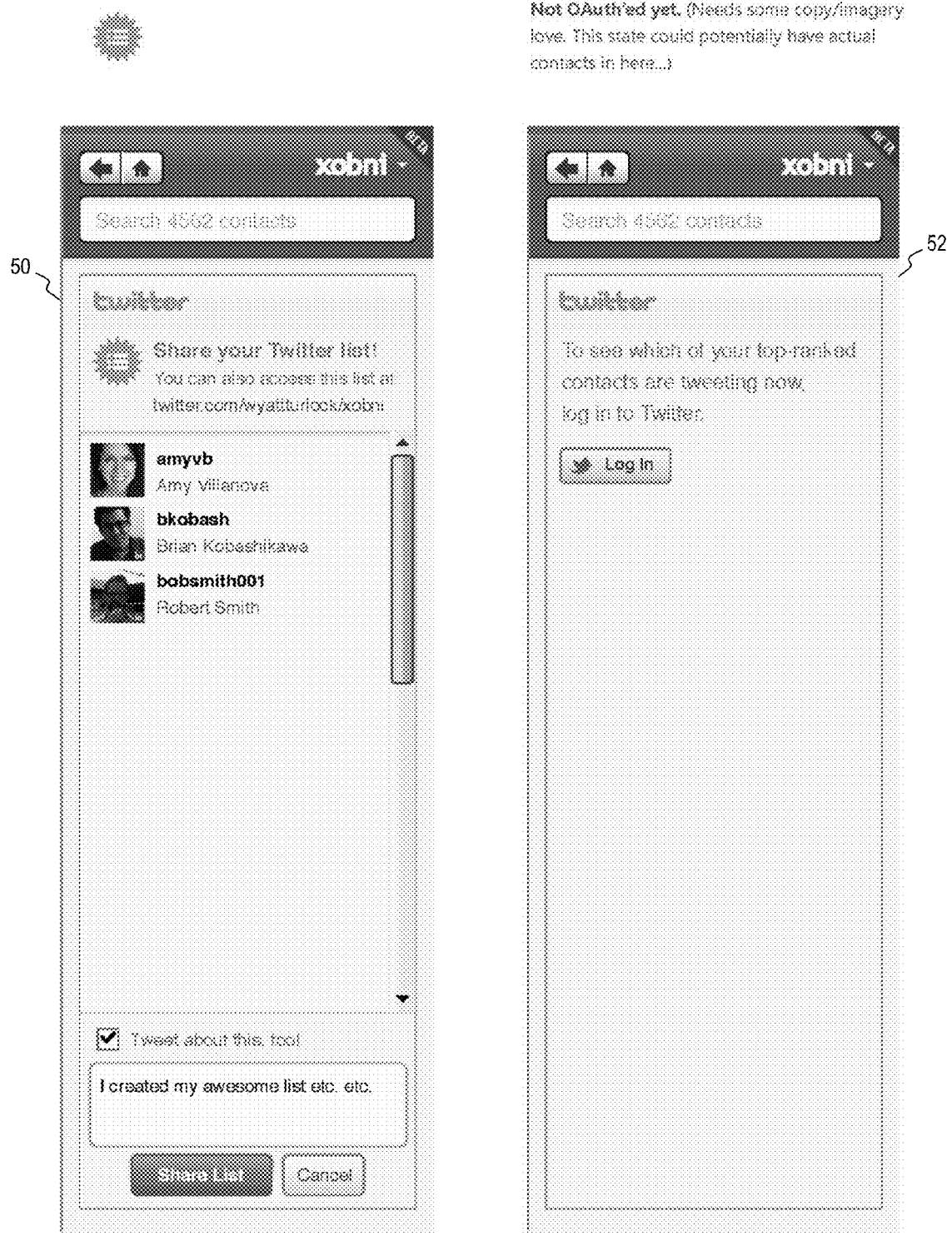
FIG. 5 shows on the left a mention in a user screen of a Twitter list, and further shows on the right the handling in a user screen of a user who is not logged into Twitter, according to one embodiment.

FIG. 5 shows on the left a mention in a user screen 50 of a Twitter list, and further shows on the right the handling in a user screen 52 of a user who is not logged into Twitter, according to one embodiment. After the ranking server uses algorithms to calculate what Twitter users should be interesting (e.g., relevant as determined by a ranking system) to the logged-in user, the ranking server programmatically assembles a Twitter list consisting of those Twitter users. This allows the user (of the mobile or other computing device associated with the ranking server) to view the list of people the ranking server has chosen in a typical Twitter client, and to also view the stream of tweets from these users. Once the list is created by the ranking server, it can be shared and viewed via typical Twitter clients.

FIG. 5 also contains a depiction of a way for the user to share a link to the Twitter list with persons that have been determined to be on the Twitter service and also to be more highly-ranked (or more meaningful) contacts of the user.

Additional specific, non-limiting examples of the collection of user data and personalization of an online service are now discussed below.

In one example, when a person wants to join the Twitter service (or the person may already be active on the Twitter service), the person typically needs or desires to determine who to follow immediately, and then determine over time who else the person should be following.

The ranking server (e.g., ranking server 123) analyzes the person's emails and determines who is important to the person by ranking her contacts. The ranking server uses email addresses and Twitter IDs to determine who is using the Twitter service and who the person's top-ranked contacts are. Based on this, the ranking server recommends that the person follow these people. The ranking server also can create a Twitter List using those identified people. The person gets a feed from this List as if the person were following these identified people.

This need is not unique to the Twitter service. Any social network may have a curation need. A user joining a network has to curate who it is that the user wants to be following, or in the case of the Facebook service, be friends with, or in the case of LinkedIn, to be connected with.

The relevancy ranking or selection process may be further tuned by looking at data for people that the user is currently following and determining some characteristics of those people, and using data related to these characteristics to predict other persons who would be appropriate or relevant for following. For example, for the LinkedIn service, suggestions for someone to be connected to in LinkedIn may be based in part on analyzing the current people that the user is connected with, and examining the connectedness of each such person in the user's inbox. If a person is not connected to above a predefined number of other people in the user's inbox, then the user is unlikely to desire to connect with them. If a person is connected to above a predefined number of other people that the user already knows (e.g., from inbox communications having a lot of emails from those other people), then the user is likely to want to be connected with that person (and a server may make the suggestion to connect to that person). Characteristics used to predict who the user may or may not want to connect with may be based on data from emails, phone calls, or other communications.

So, the approach described above may be used to curate a user's social network (automatically and dynamically, or manually). The above approach also lets a user know who the user should not follow (e.g., persons having a low relevancy ranking and/or as determined from other collected or user-specified data).

In one example, because many online networks are public (data from the network is made available publicly), the ranking server may present the data to a user as if the user had curated a list to follow or be connected with—the user does not actually have to curate it. So, in the case of the Twitter service, most people's tweets are public. The ranking server can offer to users an example of what the user's Twitter feed would have looked like if the user permitted the ranking server to rank persons to follow.

In one example, the curation of the Twitter or other service is done on an ongoing basis. For example, a user may have a change in his life situation, such as a job change, so that the user does not receive emails from a supervisor anymore. So, the supervisor's ranking will fall and the supervisor is automatically removed from being followed on Twitter due to her falling to a lower relevance (e.g., below a threshold number or defined limit). So, data for this person is dropped from the feed of data that is provided from the Twitter service. The relevancy rankings may be dynamically recalculated as often as desired (e.g., every minute, hour or daily), and the relevance of the persons on the list to follow will be calculated as the user's life changes.

There may be a default relevance that is set to cut off people below a certain relevance, or the user can set this. For example, the user may adjust by the number of messages that a the user will see per day in total from all persons. In another situation, the user may want to set the number of persons to watch, for example 100 persons, because each person tweets very little. If the persons tweet a lot, the user may set the list to follow at, for example, five persons.

Now discussing an exemplary screen from the Twitter service, the user sees a stream of classic tweets (e.g., some of these people have the word "Following" displayed underneath or near them, which indicates that the user is already explicitly following those people). For other persons on the screen, the user never explicitly followed those persons on Twitter. But the ranking server has determined that these are important people in the user's network, and has determined their Twitter IDs based on the email addresses of these people.

In one example, the graph of a user that the ranking server determines is an implicit graph, which is a set of relationships determined by inference based on the user's prior communications. The graphs from a traditional social network such as LinkedIn, Facebook, or Twitter, are explicit graphs, for which a user indicates with an action that connection or following is desired. The ranking server may use the implicit graph to curate the explicit graph.

In one example, the algorithm used by the ranking server to determine relevancy for person profiles on a mobile or other computing device may be further tuned for a specific online service. Each individual online service or network may require that the ranking server add characteristics that are not necessarily taken into account for other rankings (e.g., for a user's Outlook email account). For example, a user's nanny may be highly ranked in one network ranking because the user has a lot of communications with her, but the nanny may not fit well the characteristics statistically that would be considered a highly relevant match for LinkedIn. For example, the ranking server would notice that people on LinkedIn are fairly highly connected through the user's business email account. In another example, the ranking server would notice that the potential person to be ranked highly and selected has an email with a domain from a company that is recognized by a third-party ratings service such as Hoover.

In another example, a user looks at a home screen that includes the normal Twitter home screen. The same screen display intersperses data feeds for other persons that have been selected by the ranking server. So, the user can be provided with a single unified data stream (e.g., that includes everyone that a user would normally be following on his or her Twitter clients and further everyone that the user is implicitly following based on the ranking server selections).

The order of the persons presented on the single screen is time-based (i.e., based on time of receipt of the data such as "22 minutes ago"). The implicitly-followed people can be shaded or indicated in some other way on the screen to distinguish them from the explicitly-followed people.

In one example, the ranking server primarily looks at communications data for the user. This may include location information. From all of this data, the ranking server develops a model of the user's relationships—this is the user's social graph. This social graph can be intersected with any online or public service. Value can be added to that public service based on this knowledge of the user's private world. Thus, private communications of the user may be used to build preferences data that can then be used on a third-party server to improve the relevance of that service for the user. This might be used, for example, for travel, or e-commerce, or public or other events. The user's private information may remain private because it is not shared with third parties when personalizing the service. The user only shares sufficient data to get a personalized service (e.g., this may be only a portion of the user's social graph).

In another example, the online service is the travel service TripAdvisor, which asks a user whether she wants to contact other friends of the user that have gone to similar places being considered by the user. The ranking server may tune down this list of people suggested by TripAdvisor to those who are most relevant to the user for requesting travel suggestions (e.g., in this particular context). There are other services (e.g., Beluga, GroupMe, or Blackberry Messenger) that may benefit from the implicit relationships as provided by the ranking server as opposed to relying merely on a user's explicit graph.

Figure 6:
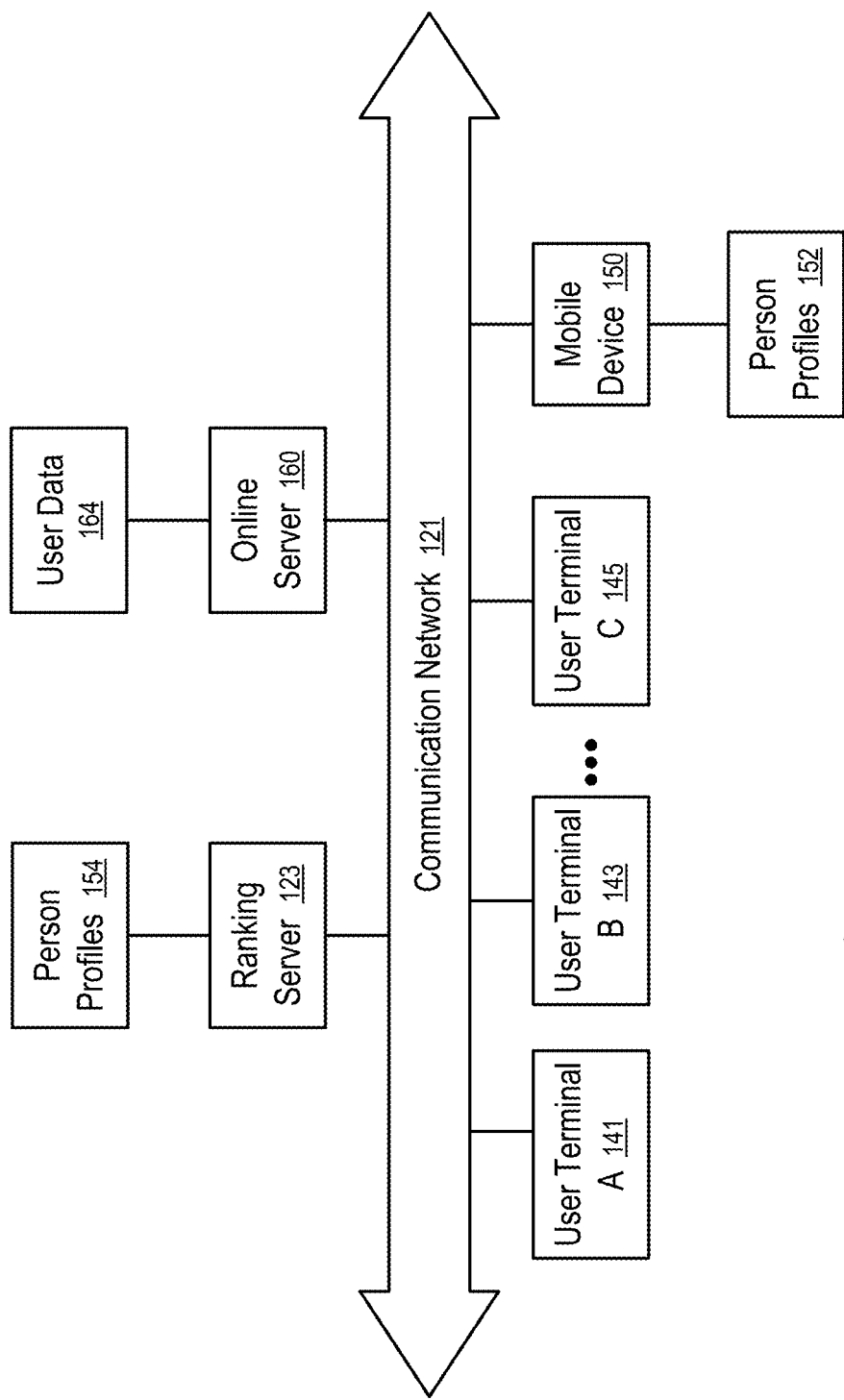
FIG. 6 shows a system to personalize or customize an Internet or other online service based on data collected for a user according to one embodiment.

FIG. 6 shows a system to personalize or customize an Internet or other online service based on data collected for a user, such as by presenting information (e.g., as illustrated in FIGS. 1-5) in a user interface screen on a display of a computing device of the user (e.g., a mobile device 150 such as an iPhone device), according to one embodiment. In FIG. 6, the user terminals (e.g., 141, 143, ..., 145) and/or mobile devices including mobile device 150 are used to access a ranking server 123 over a communication network 121. Although the foregoing description often uses a mobile device for purposes of illustration, the methods described herein may also be applied to user terminals and other forms of computing devices that interact with ranking server 123 or otherwise access data collected for a user as described above.

The ranking server 123 may include one or more web servers (or other types of data communication servers) to communicate with the user terminals (e.g., 141, 143, ..., 145) and/or mobile devices. An online server 160 provides an online service to mobile device 150 and other mobile devices.

The ranking server 123 may be connected to a data storage facility to store user provided content, such as multimedia content, navigation data, preference data, etc. The ranking server 123 may also store or have access to stored person profiles 154.

Person profiles 154 (and/or person profiles 152) may be created and updated based on email or other communications to and from mobile device 150 and other mobile devices of various users. In an alternative embodiment, person profiles 152 may be stored in a memory of mobile device 150. During operation, mobile device 150 may access and use person profiles obtained locally from mobile device 150 and/or obtained over communication network 121 from ranking server 123.

User data 164 (e.g., data regarding Twitter users that is stored at online server 160 and used for providing the Twitter or other online service and/or data that is provided to or made accessible to users of the Twitter or other online service) may be accessed and used (e.g., by mobile device 150 and/or ranking server 123) for relevancy rankings and/or presentation of contacts as described herein. Mobile device 150 or ranking server 123 may access user data 164 or other data from online server 160.

Although FIG. 6 illustrates an example system implemented in client server architecture, embodiments of the disclosure can be implemented in various alternative architectures. For example, the system can be implemented via a peer to peer network of user terminals, where content and data are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 7:
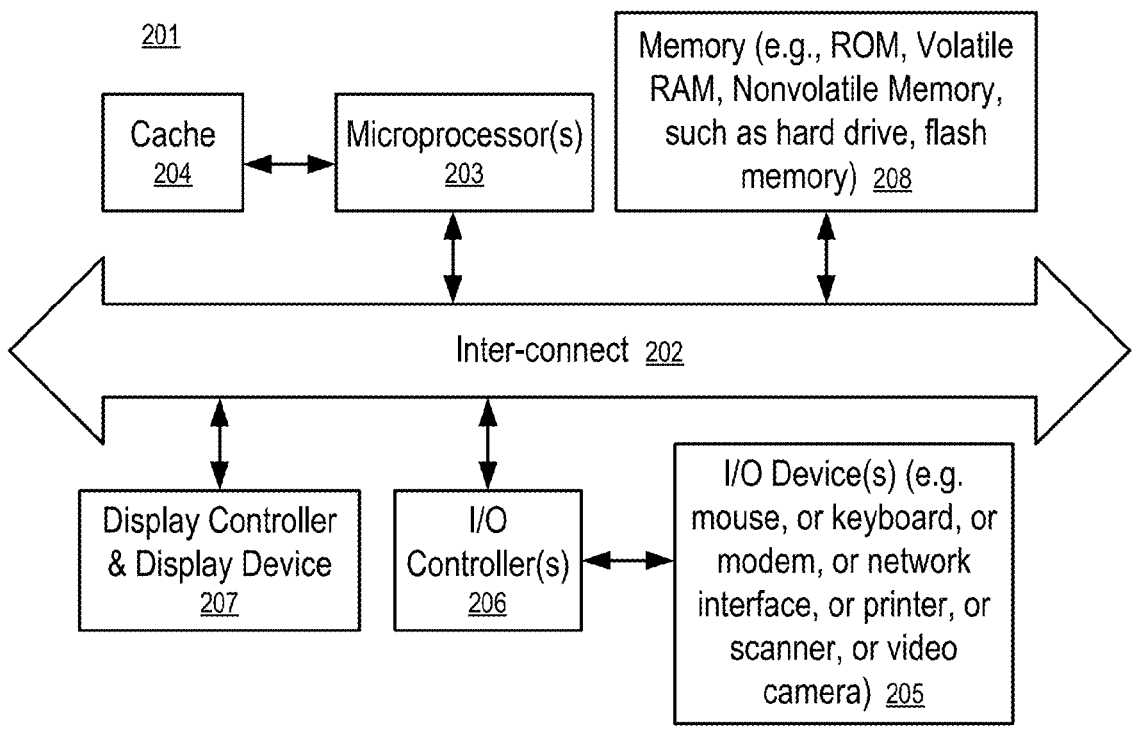
FIG. 7 shows a block diagram of a data processing system which can be used in various embodiments.

FIG. 7 shows a block diagram of a data processing system which can be used in various embodiments (e.g., to implement ranking server 123 or online server 160). While FIG. 7 illustrates various components of a computer system, it is not intended to represent any particular architecture or manner of interconnecting the components. Other systems that have fewer or more components may also be used.

In FIG. 7, the system 201 includes an inter-connect 202 (e.g., bus and system core logic), which interconnects a microprocessor(s) 203 and memory 208. The microprocessor 203 is coupled to cache memory 204 in the example of FIG. 7.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used. In one embodiment, a data processing system as illustrated in FIG. 7 is used to implement a server.

In one embodiment, a data processing system as illustrated in FIG. 7 is used to implement a user terminal. A user terminal may be in the form of a personal digital assistant (PDA), a cellular phone or other mobile device, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 8:
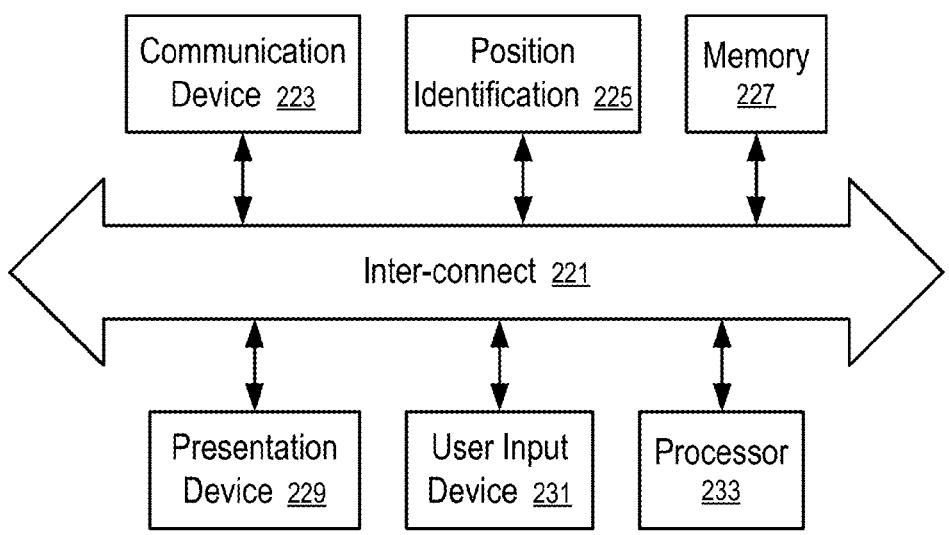
FIG. 8 shows a block diagram of a user device according to one embodiment.

FIG. 8 shows a block diagram of a user device (e.g., mobile device 150) according to one embodiment. In FIG. 8, the user device includes an inter-connect 221 connecting the presentation device 229, user input device 231, a processor 233, a memory 227, a position identification unit 225 and a communication device 223.

In FIG. 8, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 8, the communication device 223 is configured to communicate with a server. In one embodiment, the user input device 231 is configured to generate user data content. The user input device 231 may include a text input device, a still image camera, a video camera, and/or a sound recorder, etc.

Various further embodiments are now here described. In one embodiment, a method, comprises: storing a plurality of person profiles for persons associated with communications received by a user of a computing device; receiving data associated with an online service; and filtering, using at least one processor, the data based on the plurality of person profiles, wherein the filtered data is for display to the user on the computing device. In one embodiment, a server includes the at least one processor, and the method further comprises sending the filtered data to the computing device for display.

In one embodiment, the computing device may be a mobile device, a desktop computer, a laptop computer, a tablet computer, or a computing apparatus for presenting information on an advertising display or electronic billboard.

In one embodiment, the method further comprises storing data associated with prior activities of the user on the computing device, and wherein the filtering the data is further based on the stored data. In one embodiment, the computing device includes the at least one processor, and the method further comprises presenting, using a display of the computing device, the filtered data to the user. In one embodiment, the presenting comprises displaying a feed of persons provided from an online service.

In one embodiment, the method further comprises using message addresses and online service identifiers to determine persons of the plurality of person profiles that are active on the online service. In one embodiment, the method further comprises suggesting to the user a list of persons to be followed on the online service based on the persons determined to be active. In one embodiment, the method further comprises ranking the plurality of person profiles, and wherein the filtering uses the ranking.

In one embodiment, a non-transitory computer-readable storage medium stores computer-readable instructions, which when executed, cause a computing apparatus to: store, using at least one processor, a plurality of person profiles for persons associated with communications received by a user of a computing device; create a list of persons available on an online service; receive a feed from the online service that is based on the list of persons; and customize the feed based on the plurality of person profiles.

In one embodiment, the server includes the at least one processor, and the instructions further cause the computing apparatus to send the customized feed to the computing device for display. In one embodiment, the instructions further cause the computing apparatus to store data associated with prior activities of the user on the computing device, and wherein the customizing of the feed is further based on the stored data.

In one embodiment, the instructions further cause the computing apparatus to rank the plurality of person profiles, and the customizing uses the ranking. In one embodiment, the ranking is a relevancy ranking.

In one embodiment, a system, comprises: at least one processor; and memory storing instructions configured to instruct the at least one processor to: store a plurality of person profiles for persons associated with communications received by a user of a computing device; determine a set of persons of the person profiles that are active on an online service; filter the set of persons to provide a plurality of highly-ranked persons, the filtering based on the plurality of person profiles; and create a list using the highly-ranked persons, wherein the list is for presentation to the user on the computing device.

In one embodiment, each of the persons associated with the communications received by the user is a person selected from the group consisting of: a person cc'd or copied on one of the communications, a person bcc'd or blind-copied on one of the communications, a sender of one of the communications, a recipient of one of the communications, and a person referenced in the body, text, or other content of one of the communications.

In one embodiment, the instructions are further configured to instruct the at least one processor to collect communications associated with the computing device. The list comprises messages from the highly-ranked persons. In one embodiment, the system further comprises a display, and wherein the instructions are further configured to instruct the at least one processor to present, using the display, the list to the user.

In one embodiment, the list comprises data for each of the highly-ranked persons, and wherein the data is selected from the plurality of person profiles. In one embodiment, the filtering uses a relevancy ranking for each of the plurality of person profiles. In one embodiment, the system further comprises a database storing the plurality of person profiles.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   at least one processor; and
   memory storing instructions configured to instruct the at least one processor to:
   store a plurality of person profiles for persons associated with communications received by a user of a computing device, wherein each of the persons associated with the communications received by the user is a sender to the user of one of the communications;
   store activity data associated with prior activities of the user on the computing device regarding respective functions of the computing device that are activated by the user when communicating with each of the persons;
   determine a set of persons of the person profiles that are active on an online service;
   filter the set of persons to provide a plurality of highly-ranked persons, the filtering based on the plurality of person profiles, wherein the filtering uses a relevancy ranking for each of the plurality of person profiles, and the relevancy ranking is based in part on the stored activity data;
   select first messages from the plurality of highly-ranked persons, wherein the first messages are for presentation to the user on the computing device;
   replace a respective user identifier, used by the online service, for each of the plurality of highly-ranked persons with a replacement name obtained from the corresponding profile of the plurality of person profiles for presenting a message from the respective highly-ranked person to the user; and
   cause presentation of the first messages to the user, wherein each of the first messages uses the respective replacement name.

2. The system of claim 1, wherein the instructions are further configured to instruct the at least one processor to collect communications data associated with the computing device.

3. The system of claim 1, wherein the respective user identifier is a user name, and the replacement name is a proper name.

4. The system of claim 1, wherein the respective functions of the computing device are activated by the user by activating at least one button of the computing device.

5. A method, comprising:
   storing a plurality of person profiles for senders of communications to a user of a computing device;
   storing activity data associated with activities of the user on the computing device regarding respective functions of the computing device that are activated by the user when communicating with each of the senders;
   ranking, by at least one processor, the plurality of person profiles, wherein the ranking uses a relevancy ranking for each of the plurality of person profiles, and the relevancy ranking is based in part on the stored activity data;
   updating the ranking on an ongoing basis;
   receiving a feed from an online service, the feed including a respective message from each of a portion of the senders, and each respective message including a respective user identifier for the sender that is used for identification of the sender by the online service;
   filtering the feed, for display to the user, based on the updated ranking to provide first messages;
   replacing each respective user identifier in the first messages with a replacement name obtained from one of the plurality of person profiles; and
   causing presentation of the first messages to the user, wherein each of the first messages uses the respective replacement name.

6. The method of claim 5, further comprising receiving a user selection of a maximum number of messages that the user is to receive in the filtered feed for any given predetermined time period.

7. The method of claim 5, further comprising adding information about each respective sender to its respective message, wherein the added information is not shown for messages of the respective sender in a home stream of the user on the online service.

8. The method of claim 7, wherein the added information is obtained from prior messages that the user has received.

9. The method of claim 5, further comprising receiving a user selection from the computing device associated with a message from a first sender, and in response to the user selection, presenting a contact card to the user that includes information about the first sender, wherein the included information is obtained from at least one of the plurality of person profiles.

10. The method of claim 5, further comprising displaying an indication to the user for each respective message to indicate whether the user is explicitly following the respective sender on the online service.

11. The method of claim 5, wherein the updating of the ranking is performed as new communications to the user are received.

12. The method of claim 5, wherein the updating of the ranking is periodically performed for a predetermined time period.

13. The method of claim 5, wherein the computing device is a mobile device, and the method further comprising storing at least a portion of the plurality of person profiles in a memory of the mobile device.

14. The method of claim 5, wherein the online service is a first online service, the feed is a first feed, and the ranking is a first ranking, the method further comprising:
  receiving a second feed from a second online service;
  ranking the plurality of person profiles using an algorithm tuned to the second online service to provide a second ranking; and
  filtering the second feed, for display to the user, based on the second ranking.

15. A non-transitory computer-readable storage medium storing computer-readable instructions, which when executed, cause a system to:
  store a plurality of person profiles for senders of communications to a user of a computing device;
  store activity data associated with activities of the user on the computing device regarding respective functions of the computing device that are activated by the user when communicating with each of the senders;
  rank, by at least one processor, the plurality of person profiles to select a portion of the senders, wherein the filtering uses a relevancy ranking for each of the plurality of person profiles, and the relevancy ranking is based in part on the stored activity data;
  provide a feed to the user including first messages of the selected senders, the feed including a respective message from each of the senders, and each respective message including a respective user identifier for the sender that is used for identification of the sender by an online service;
  replace each respective user identifier in the first messages with a replacement name obtained from one of the plurality of person profiles; and
  cause presentation of the first messages to the user, each of the first messages using the respective replacement name.

16. The storage medium of claim 15, wherein the instructions further cause the system to further customize the feed for the user using information other than a name from the plurality of person profiles.

17. The storage medium of claim 15, wherein the instructions further cause the system to send the feed from a server to the computing device for display, and the server includes the at least one processor.

* * * * *